United States Patent
Boliek et al.

(10) Patent No.: US 11,877,350 B2
(45) Date of Patent: Jan. 16, 2024

(54) SPECIAL LOCAL AREA NETWORK WITH SECURE DATA TRANSFER

(71) Applicant: MO-DV, INC., Campbell, CA (US)

(72) Inventors: Martin Boliek, San Francisco, CA (US); Greg Bohrn, Campbell, CA (US)

(73) Assignee: MO-DV, INC., Campbell, CA (US)

( * ) Notice: Subject to any disclaimer, the term of this patent is extended or adjusted under 35 U.S.C. 154(b) by 0 days.

(21) Appl. No.: 16/517,226

(22) Filed: Jul. 19, 2019

(65) Prior Publication Data

US 2021/0021988 A1 Jan. 21, 2021

(51) Int. Cl.
| | |
|---|---|
| *H04W 8/26* | (2009.01) |
| *H04W 12/08* | (2021.01) |
| *H04W 48/16* | (2009.01) |
| *H04L 65/612* | (2022.01) |
| *H04L 65/75* | (2022.01) |
| *H04W 84/18* | (2009.01) |

(52) U.S. Cl.
CPC .............. *H04W 8/26* (2013.01); *H04L 65/612* (2022.05); *H04L 65/765* (2022.05); *H04W 12/08* (2013.01); *H04W 48/16* (2013.01); *H04W 84/18* (2013.01)

(58) Field of Classification Search
None
See application file for complete search history.

(56) References Cited

U.S. PATENT DOCUMENTS

| | | |
|---|---|---|
| 6,915,124 B1 | 7/2005 | Kiessling et al. |
| 7,653,689 B1 * | 1/2010 | Champagne ........ H04L 67/1063 |
| | | 709/227 |
| 8,194,538 B2 | 6/2012 | Bornstein et al. |
| (Continued) | | |

OTHER PUBLICATIONS

Mahan, et al. Secure data transfer guidance for industrial control and SCADA systems. * In: Pacific Northwest National Lab. {PNNL}. Sep. 2011 (Sep. 2011) Retrieved on Aug. 13, 2020 (Aug. 13, 2020) from <https://pnnl.gov/main/publications/external/technical_reports/PNNL-20776.pdf> entire document.

(Continued)

*Primary Examiner* — Christopher T Wyllie
(74) *Attorney, Agent, or Firm* — Womble Bond Dickinson (US) LLP

(57) ABSTRACT

A secure local area network and method for using the same are disclosed. In one embodiment, the network arrangement comprises a plurality of access points that are part of one or more existing networks and operable to individually address and communicate with each other to form a local area network (LAN) to transfer data between two or more of the plurality of access points using point-to-point links independent of their function in the one or more first existing networks, where each access point of the plurality of access points is associated with a cache to store content that may be forwarded to other access points access points in the plurality of access points, and wherein one access point is operable to identify one or more of the plurality of access points from which desired content is cached and to request at least one of the one or more of the plurality of access points to transfer desired content to the one access point via one or more direct point-to-point transfers between access pairs of the plurality of access points.

23 Claims, 8 Drawing Sheets

Internet to client networking

(56) References Cited

U.S. PATENT DOCUMENTS

| | | | |
|---|---|---|---|
| 8,751,795 B2 | 6/2014 | Widergren et al. | |
| 9,712,410 B1* | 7/2017 | Char | H04L 43/08 |
| 10,104,046 B2 | 10/2018 | Boliek et al. | |
| 10,304,349 B1* | 5/2019 | Stickle | G09B 7/02 |
| 10,652,343 B2* | 5/2020 | van Brandenburg | H04L 67/52 |
| 10,771,590 B2* | 9/2020 | Tomkins | H04L 67/1097 |
| 2002/0184368 A1* | 12/2002 | Wang | H04L 41/044 |
| | | | 709/224 |
| 2004/0117455 A1* | 6/2004 | Kaminsky | H04L 69/14 |
| | | | 709/219 |
| 2004/0215687 A1 | 10/2004 | Klemba et al. | |
| 2005/0073967 A1* | 4/2005 | Hennessey | H04L 63/0236 |
| | | | 370/312 |
| 2007/0089110 A1 | 4/2007 | Li | |
| 2008/0005695 A1 | 1/2008 | Ozzie et al. | |
| 2008/0086574 A1* | 4/2008 | Raciborski | H04L 61/4541 |
| | | | 709/245 |
| 2009/0154466 A1 | 6/2009 | Townsley et al. | |
| 2010/0198913 A1 | 8/2010 | Garcia-Luna-Aveces et al. | |
| 2010/0202428 A1 | 8/2010 | Thompson et al. | |
| 2011/0225311 A1* | 9/2011 | Liu | H04L 45/125 |
| | | | 709/231 |
| 2011/0225312 A1* | 9/2011 | Liu | H04N 21/632 |
| | | | 709/231 |
| 2012/0066493 A1* | 3/2012 | Widergren | G06F 21/606 |
| | | | 713/160 |
| 2012/0082131 A1* | 4/2012 | Agrawal | H04W 36/08 |
| | | | 370/331 |
| 2012/0092997 A1* | 4/2012 | Mihaly | H04L 67/56 |
| | | | 370/237 |
| 2012/0209952 A1 | 8/2012 | Lotfallah et al. | |
| 2014/0189060 A1* | 7/2014 | Westphal | H04L 67/289 |
| | | | 709/217 |
| 2014/0258771 A1 | 9/2014 | Xie et al. | |
| 2015/0089075 A1* | 3/2015 | Strigeus | H04L 65/65 |
| | | | 709/231 |
| 2015/0131674 A1* | 5/2015 | Kao | H04L 61/2596 |
| | | | 370/420 |
| 2015/0288732 A1 | 10/2015 | Phillips et al. | |
| 2015/0319488 A1 | 11/2015 | Krikorian et al. | |
| 2016/0119165 A1 | 4/2016 | Keronen | |
| 2016/0119408 A1 | 4/2016 | Bertz et al. | |
| 2016/0204916 A1* | 7/2016 | Dao | H04L 45/02 |
| | | | 709/226 |
| 2016/0294971 A1* | 10/2016 | Li | H04L 47/125 |
| 2017/0346924 A1* | 11/2017 | Xiong | H04L 67/63 |
| 2018/0018159 A1* | 1/2018 | Eller | H04W 12/10 |
| 2018/0069862 A1 | 3/2018 | Cholas et al. | |
| 2018/0097908 A1* | 4/2018 | Ayyagari | H04L 67/1097 |
| 2018/0167486 A1* | 6/2018 | Pacella | H04L 67/1097 |
| 2019/0044921 A1 | 2/2019 | Boliek et al. | |
| 2019/0104068 A1* | 4/2019 | Hofmann | H04L 65/80 |
| 2019/0166225 A1* | 5/2019 | Yokota | H04L 65/611 |
| 2021/0044850 A1* | 2/2021 | Gala | H04L 65/75 |

OTHER PUBLICATIONS

International Preliminary Report on Patentability received for PCT Patent Application No. PCT/US2020/039008, dated Aug. 31, 2020, 56 pages.

International Preliminary Report on Patentability received for PCT Application No. PCT/US2020/039015, dated Sep. 28, 2020, 18 pages.

International Preliminary Report on Patentability received for PCT Patent Application No. PCT/US2020/039010, dated Sep. 9, 2020, 10 pages.

International Preliminary Report and Written Opinion on the Patentability of Application No. PCT/US2020/039008 dated Feb. 3, 2022. 8 pages.

International Preliminary Report and Written Opinion on the Patentability of Application No. PCT/US2020/039010 dated Feb. 3, 2022. 8 pages.

International Preliminary Report and Written Opinion on the Patentability of Application No. PCT/US2020/039015 dated Feb. 3, 2022. 12 pages.

* cited by examiner

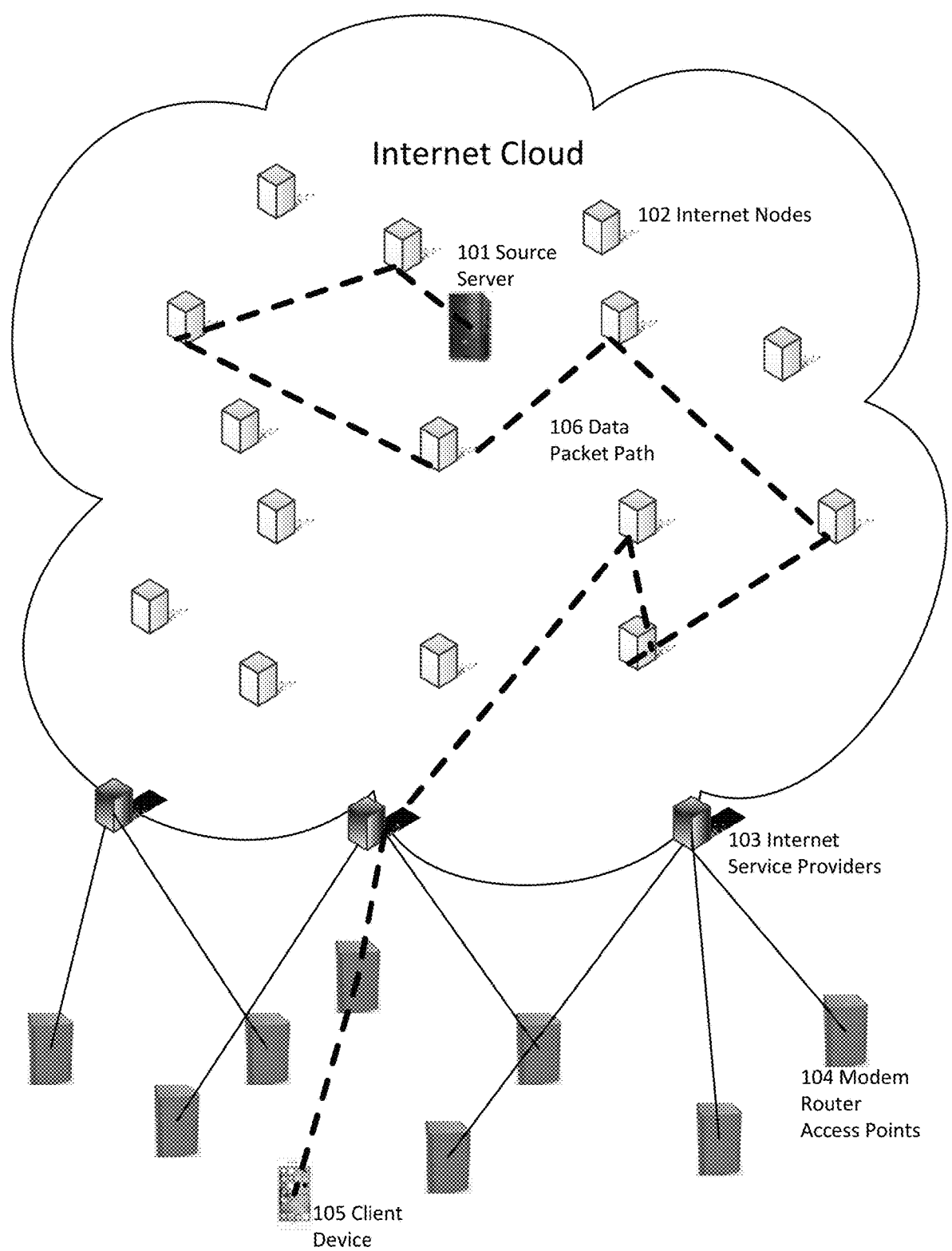
Figure 1a — Internet to client networking

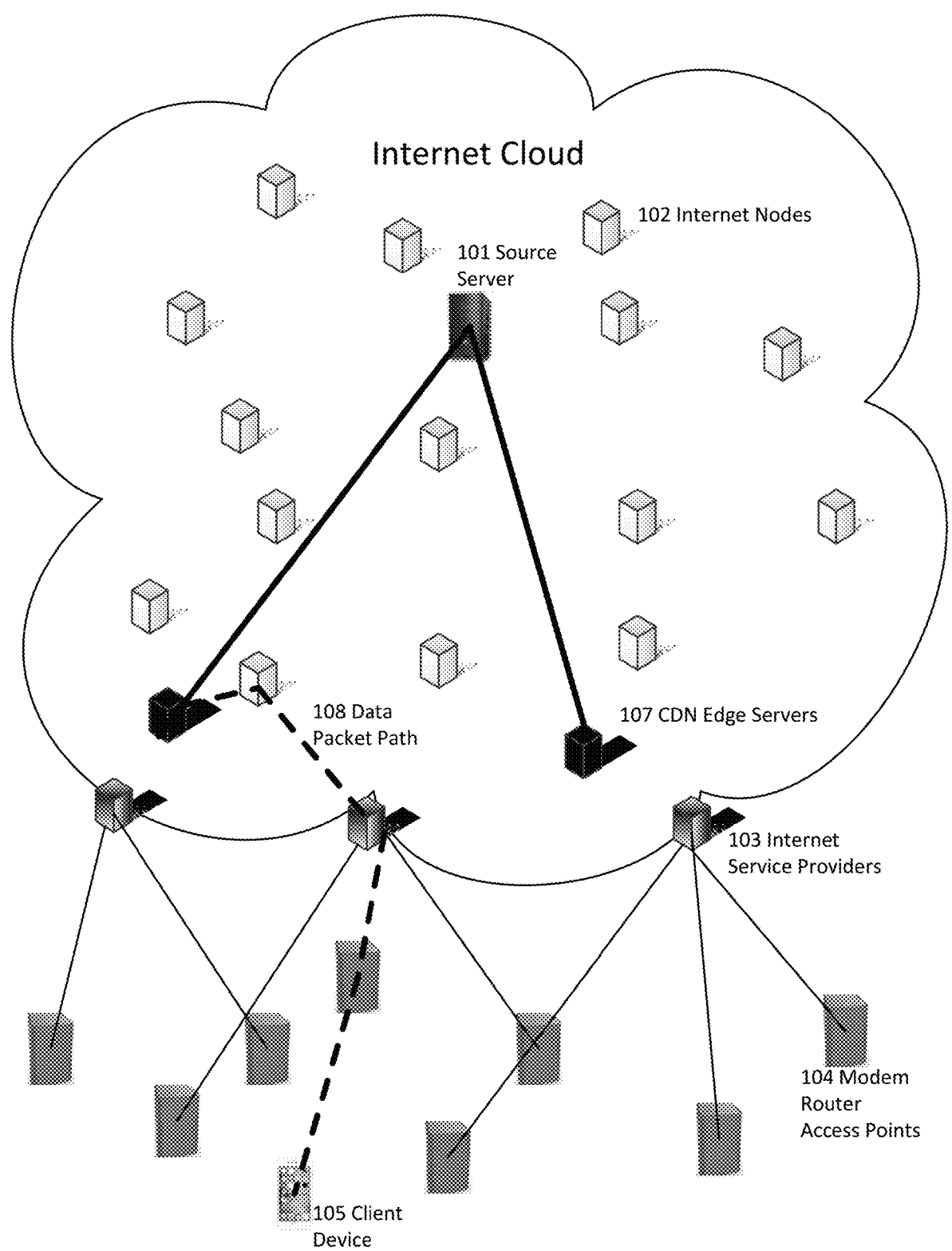
Figure 1b — Internet to client networking with a CDN

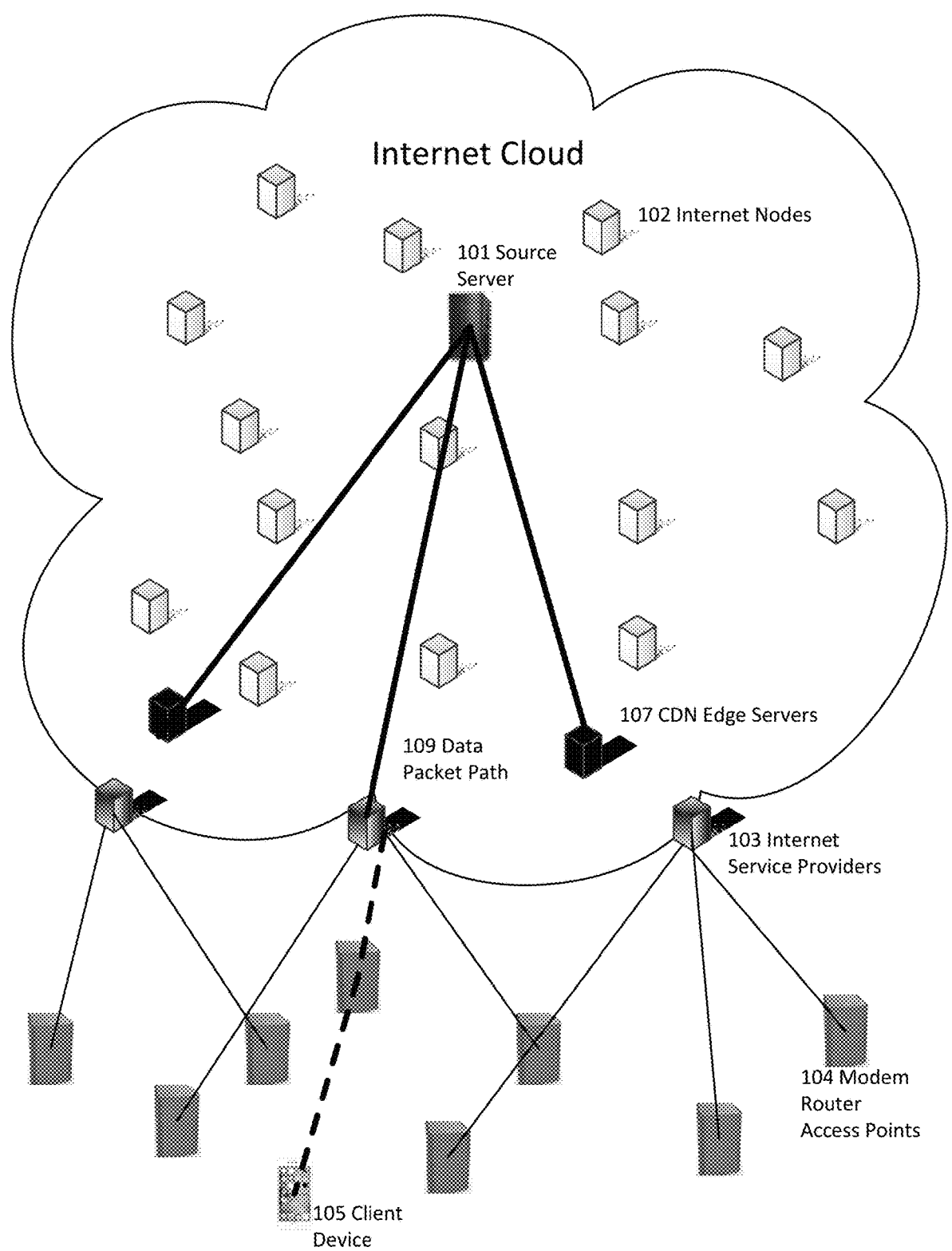
Figure 1c — Internet to client networking with PoP servers

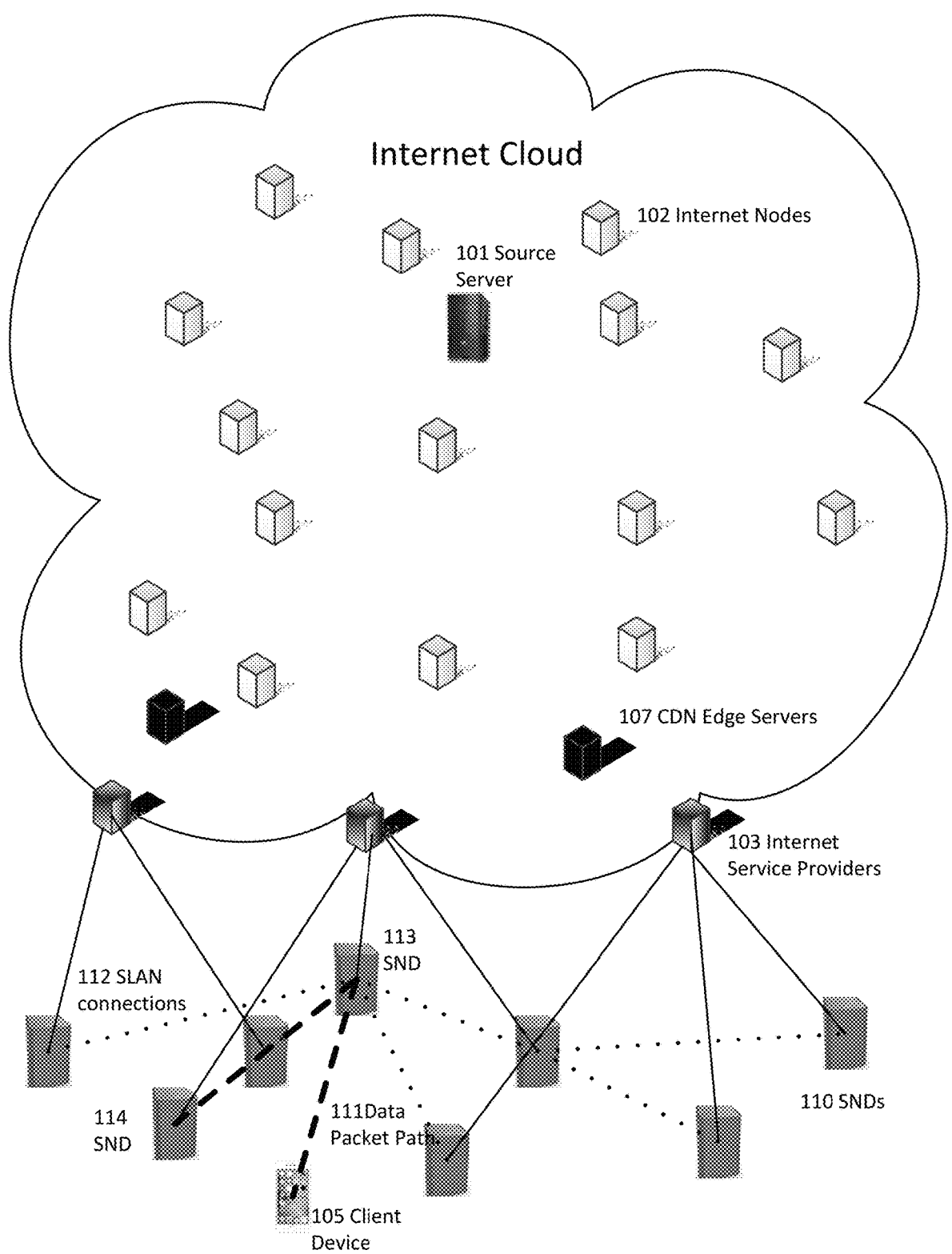
Figure 1d — SLAN to client networking

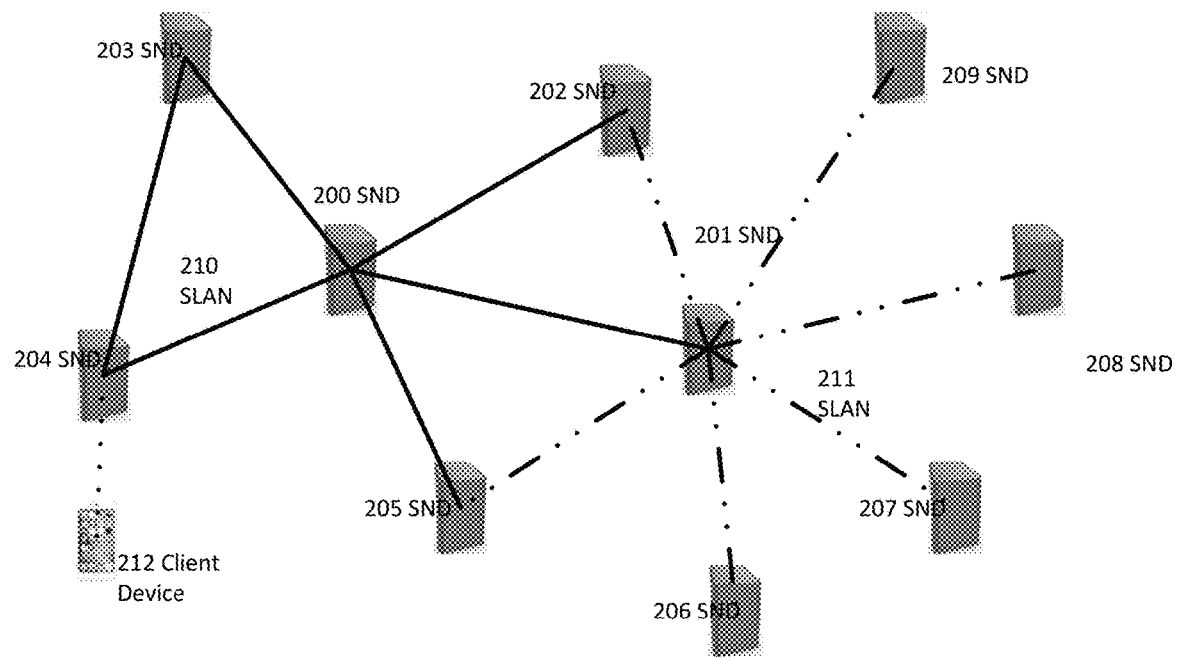
Figure 2 — Adjacent Special Local Area Networks
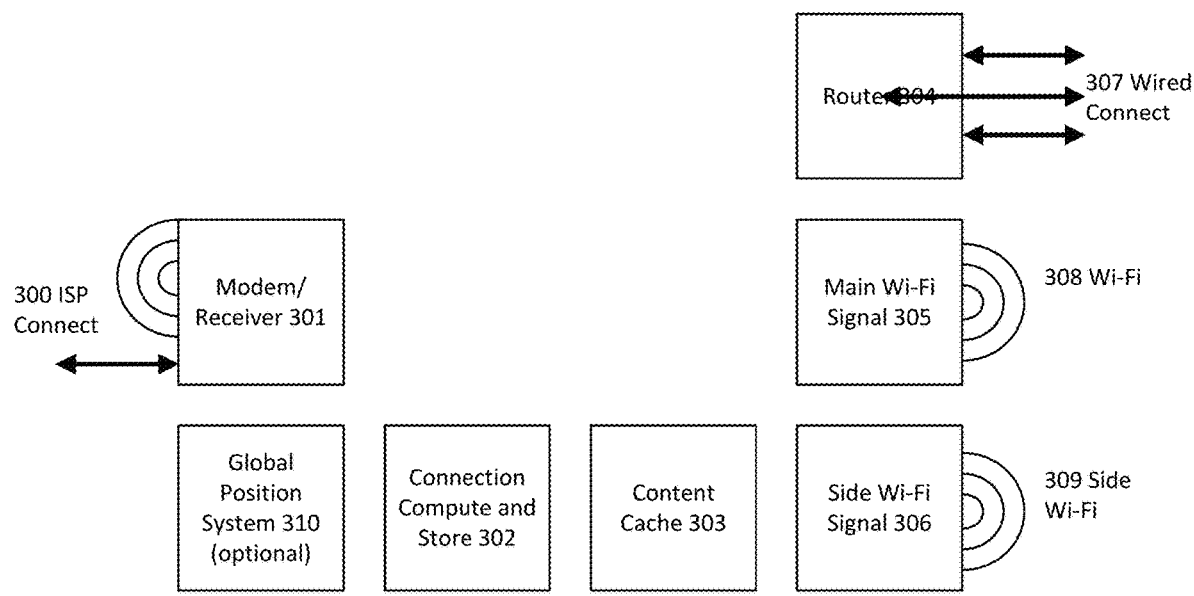
Figure 3 — Special Network Device

| SND Discovery and Connect 401 | SLAN Local DNS Manage 402 | SLAN Content Search 403 | SLAN Content Transfer 404 | SND Content Cache 405 | SND Analytics 406 | Global Position System 408 (optional) |
|---|---|---|---|---|---|---|
| Server Software 407 ||||||||
| Modem, Router, Access Point, Wi-Fi Repeater Core Software 400 |||||||

Figure 4 — Special Network Device Software Layers

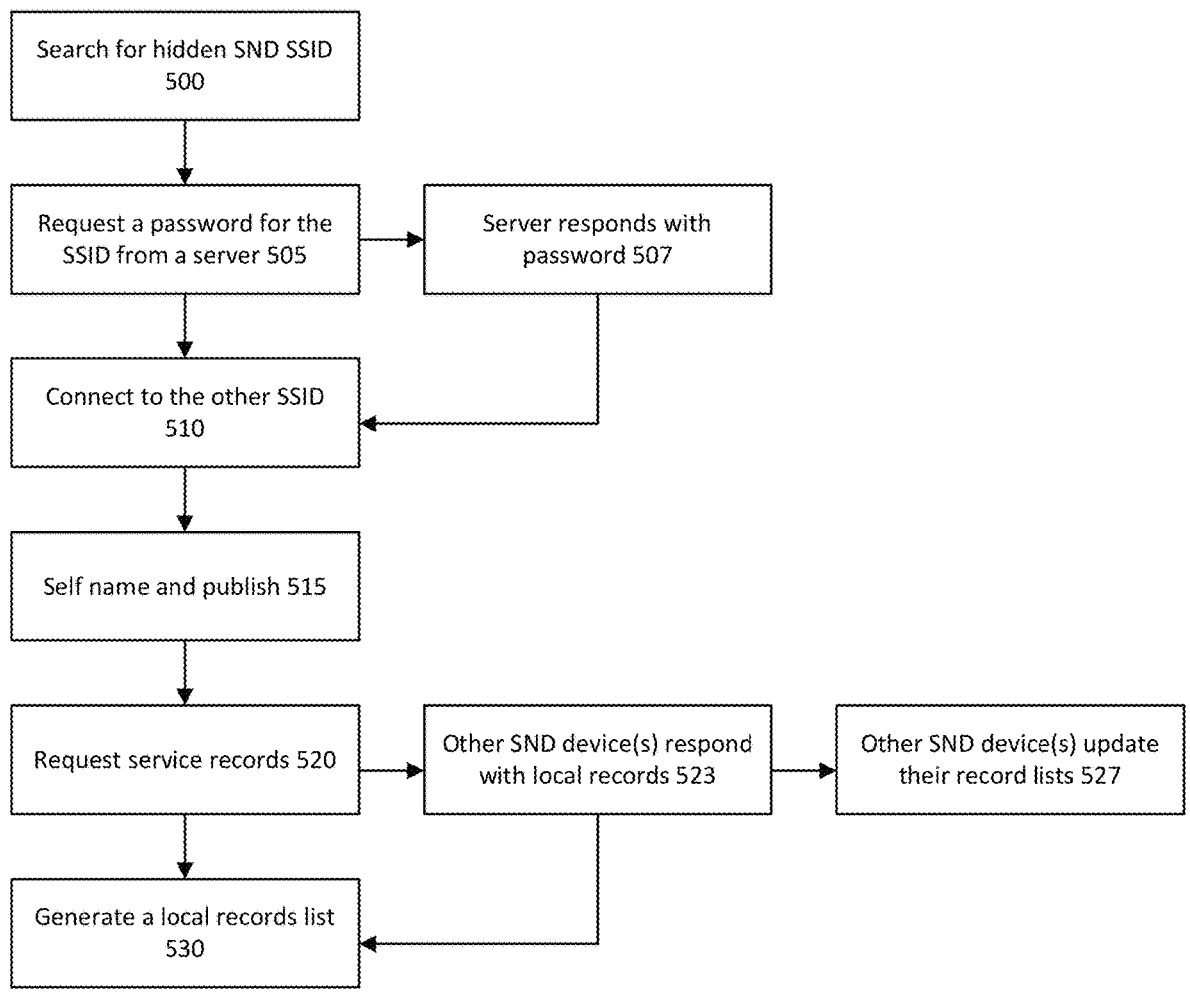
Figure 5 — Creating a SLAN via peer to peer

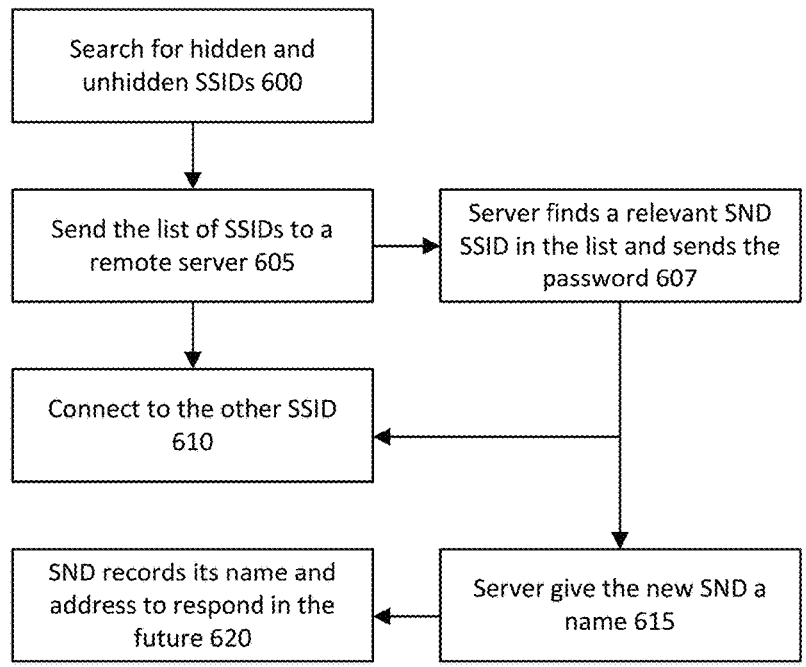
Figure 6 — Creating a SLAN via via a remote server
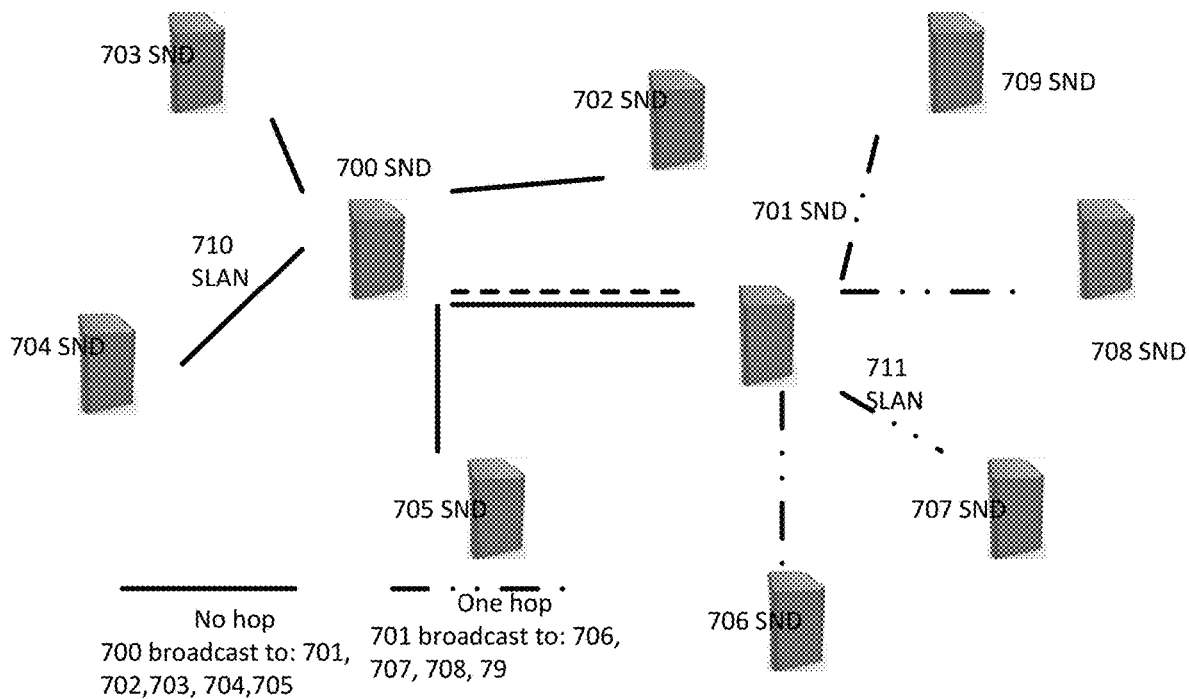
Figure 7 — No hop and multi-hop search

SPECIAL LOCAL AREA NETWORK WITH SECURE DATA TRANSFER

FIELD OF THE INVENTION

Embodiments of the invention generally relate to the field of networking and secure data transfer over ad-hoc networks.

BACKGROUND

The digital data transferred over the Internet is growing rapidly, driven primarily by video. Downloaded video, Video On Demand (VOD), live video (both broadcast video and consumer video), interactive video (e.g. video conferencing, video telephony, and video gaming) are all growing in popularity.

Networking companies, such as cellular and cable companies, are investing heavily in everything from optical fiber to next generation millimeter wave cellular (e.g. 5G) technology. However, there are often diminishing returns on such investments for these companies as the "price per bit" has fallen rapidly due to heavy competition. The so called "last mile" problem—the data transfer between the network data center (e.g., Internet Service Provider (ISP), cellar network) and customer's device or local area network (LAN)—is by far the most expensive and difficult of the networking challenges.

For video specifically, there are three challenging metrics for data transfer performance directly related to Quality of Service (QoS) and Quality of Experience (QoE). First, especially for interactive video and live video, reducing the latency (time from source to destination) is critical for a pleasant user experience. With high latency, people in a video conference, for example, often talk over each other creating awkward and unnatural communication.

Second, the continuity of transfer is critical, especially for VOD, live and interactive video. Pauses and the dreaded buffering symbol are annoying to the viewer. Since a large amount of data needs to be transferred at a relatively constant rate for the duration of the video, any interruption or diminution in bandwidth will cause problems. Most approaches to mitigating the effects of changing bandwidth involve adapting the size and quality of the video data dynamically to match fluctuations in bandwidth. Quality selective protocols (e.g., Dynamic Adaptive Streaming over HTTP or MPEG-DASH) are used. This reduces the bandwidth needed to transfer the video at the cost of video quality. However, it does not solve network drop out when there is no data stream at all.

Third, simply put, video data is very large. This requires a lot of bandwidth and computation at the source, at strategic nodes throughout the networks, and, worst of all, at the "last mile". In many places and/or at popular times for streaming such bandwidth is limited. And improving bandwidth for all places, and for peak time, is hugely expensive. Witness the extremely slow roll out of the new 5G cellular technology.

One increasingly common technique to help mitigate these problems is Content Delivery Networks that are sometimes called Content Distribution Networks (CDN). CDNs are geographically distributed networks of proxy servers and data centers at the edge of the network. Rather than video data being served from a single server or data center at one location in the world, the video is distributed (copied) from the source server to a number of CDN edge nodes strategically placed around the globe. The data copies are either preloaded into the CDN cache as desired or transferred when a CDN edge node receives the first request.

Requests for data from client devices are redirected to the physically most appropriate CDN edge node. If the CDN edge node has the data cached the response is quick with relatively low latency. If not, the CDN edge node requests the data from either another CDN edge node or the source server. The data is delivered to the client device and cached at the CDN edge node.

For a content provider with a central repository of content, there are two advantages. First, since the content provider's source server or data center only has to serve a few (maybe hundreds) CDN edge nodes, rather than potentially millions of client requests, the burden on the source server and store are less. Second, in many cases the transfer between the source server and the CDN edge nodes is achieved with high bandwidth, predictable, even dedicated, network connections, reducing the latency from the source server to the edge nodes. For example, Amazon Web Services, AWS, uses dedicated high bandwidth connections between its regional data centers and the AWS CloudFront CDN service. (Note that the CDN service can be independent of the content server and store service. And high bandwidth connections between a source server and CDN edge data centers are not always available. In fact, using multiple CDN services, e.g. AWS CloudFront and Akamai, for better coverage is an increasing popular approach.)

Optimizing CDN technology requires a large number of parameters and strategies to achieve high performance. The caching strategy (what should be saved at the edge and for how long) is crucial and dependent on context. Artificial Intelligence methods can be used to decide what and where to pre-position data or to let the data be cached at the node only after the first client request. The proxy mapping by location may be modified to include bandwidth, edge node utilization, and data availability. CDN technologies are a rapidly evolving field with an ever increasing number companies (e.g. Akamai, Amazon Web Services CloudFront) expanding their edge networks.

CDNs are good for reducing traffic and latency from the content source server. But they are still limited with respect to regional latency and bandwidth. Some companies that value low latency above all else are placing dedicated edge servers right in the Point of Presence (PoP) of the Internet Service Provider (ISP) that connects the clients to the Internet. This might work with large ISPs such as Comcast Xfinity and ATT. However, there are hundreds, maybe thousands, of smaller ISPs so full coverage with dedicated edge servers does not scale well.

SUMMARY OF THE INVENTION

A secure local area network and method for using the same are disclosed. In one embodiment, the network arrangement comprises a plurality of access points that are part of one or more existing networks and operable to individually address and communicate with each other to form a local area network (LAN) to transfer data between two or more of the plurality of access points using point-to-point links independent of their function in the one or more first existing networks, where each access point of the plurality of access points is associated with a cache to store content that may be forwarded to other access points in the plurality of access points, and wherein one access point is operable to identify one or more of the plurality of access points from which desired content is cached and to request at least one of the one or more of the plurality of access points to transfer desired content to the one access point via one or more direct point-to-point transfers between access pairs of the plurality of access points.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1a is a diagram illustrating typical Internet networking.

FIG. 1b is a diagram illustrating CDN edge networking.

FIG. 1c is a diagram illustrating PoP edge networking.

FIG. 1d is a diagram illustrating Special Local Area Network edge networking in accordance with one embodiment.

FIG. 2 is a diagram of one embodiment of a SLAN.

FIG. 3 is a block diagram of one embodiment of a Special Network Device.

FIG. 4 is a flow diagram of software components in the SND.

FIG. 5 is a flow diagram illustrating one embodiment of communication between nodes in a SLAN network using the Zero Configuration Network protocol.

FIG. 6 is a flow diagram illustrating an embodiment of communication between nodes in a SLAN network using a central server.

FIG. 7 is a communication diagram of one embodiment of a no hop and multi-hop search.

DESCRIPTION OF EMBODIMENTS

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "networking" or the like, refer to the action and processes of a computer system(s), or similar electronic computing device(s), that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may be comprised of a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Similarly, general purpose networking equipment may be employed including, but not limited to, modems, routers, Wi-Fi access points, Bluetooth, and other wired and wireless networking hardware systems.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

Embodiments of the present invention are predicated on a number of existing Special Network Devices (SND) Wi-Fi access points physically close enough with each other to communicate directly (e.g., within about 50 meters). These are the nodes in a Special Local Area Network (SLAN).

These SNDs (via the embodiments described below) connect to one another, forming a SLAN independent of any connection to the Internet or other private network. These SNDs intelligently cache data that passes through (or is proactively requested by the SND). Additionally, in some embodiments, the SND has access to data on connected client devices.

Simultaneously, these SNDs also serve the traditional function of connecting wireless clients to the Internet or other private networks. However, now the wireless client can also benefit from the collective caching of the SLAN. If a data request from a wireless client can be served from the data cached in the SLAN, that access is generally faster and has no impact on (and does not suffer from) Internet traffic.

Embodiments of the present invention have one or more advantages. First, embodiments of the invention help to improve network performance, especially within the so called "last mile"—the connection between the ISP or private network (a conventional network independent of the Internet) and the local device—in certain situations. Embodiments of the invention have the potential to reduce bandwidth problems enabling better performance for video and other large data transfers and perhaps also improve continuity and reduce latency.

Second, embodiments of the invention create an entirely new layer in this data caching approach—creating a Special Local Area Networks (SLAN) and caching right at the Wi-Fi access point physically located in a home or business. While many or all of these nodes are also connected to a central network, or networks (e.g. the Internet via an ISP), the network is able to transfer data between the networked nodes independently of that central network.

In highly populated areas, such as business districts and urban and suburban neighborhoods, there are often multiple Wi-Fi access points (or hotspots or IEEE 802.11x "Wi-Fi" networks) that are within range and broadcasting their name (Service Set Identifier, SSID). Most of these Wi-Fi access points require a password to authenticate that the client is allowed access. In one embodiment, the client device sees these Wi-Fi access points and the Wi-Fi access points themselves are close enough to connect to each other.

In one embodiment, all the Wi-Fi access points that are capable of the functionality described below and that are physically located close enough to connect to each other, do so forming a SLAN.

In one embodiment, these Wi-Fi access point devices are called Special Network Devices (SNDs), and the functionality of a SND includes caching hardware and software for handling data; discovering other SNDs; networking with other SNDs forming a SLAN; message passing and responding within a SLAN; data transfer within a SLAN; as well as functioning as a traditional Wi-Fi access point for client devices and communicating with the ISP or private network. In some embodiments, this functionality is achieved with a conventional computer running custom software connected to a traditional Wi-Fi access point device. In other embodiments, integrated SND hardware with these specific capabilities is employed.

In one embodiment, the networking between SNDs is embodied in a sideband signal (a dedicated separate Wi-Fi signal for this purpose). For security, in one embodiment, this sideband signal is limited to SNDs by hardware and/or software authentication. In other embodiments, the SND connects via switching between Wi-Fi signals or other wireless and/or wired communication functionality.

In one embodiment, one SND may be connected to multiple other SNDs forming a SLAN. However, these are not closed mesh networks (e.g not a private network) since the SNDs, in one embodiment can self-join and self-organize into a network. In one embodiment, one SND is capable of connecting directly to N other SNDs. Those N SNDs are not necessarily all connected to each other. This first SND acts as a bridge node, or repeater, or more specifically a Wi-Fi repeater, between the other SNDs that are not directly connected. Likewise, some of the N other SNDs might be connected to SNDs that the first SND is not. Thus, those SNDs act as bridges, or Wi-Fi repeaters, between these SNDs. Messaging and data is transmitted by hopping between these nodes. Theoretically, this network could extend to the physically furthest SND that can be connected to at least one of the others, though the costs for multiple hops between nodes in a network may degrade performance.

In one embodiment, the SNDs cache large files or objects locally, especially multimedia content, based on heuristic and learned algorithms. In one embodiment, these algorithms are initially derived from those employed with CDN and other caching strategies, and are expected to evolve for the characteristics of a given SLAN. A common example of a caching strategy is the "least accessed" principle. As data is accessed, timestamps are updated. When memory is needed for new data the least accessed data is deleted first.

With an arrangement of SNDs, when a client requests large data, the SLAN is queried to see if that data is available locally, and if so, the client request is served locally. Caching files or objects at the Wi-Fi access point level of the network has many of the same bandwidth and latency reduction advantages as CDNs and PoPs. It would certainly help with popular live broadcasts and on-demand binging, especially during the network congested evening hours. (Note that the advantage of embodiments of the invention for interactive video which requires low latency is not well known.)

Embodiments of the invention also facilitate streaming video. One SND can receive streaming data and transfer that data throughout the SLAN for several clients, reducing the burden on the ISP, Internet, and/or private network. There are practical limitations in performance, however. For example, SLAN nodes (SNDs) connected via Wi-Fi repeaters would require retransmission of packets, creating some amount of congestion in the local spectrum. Nevertheless, embodiments of the invention improve the performance of streaming popular content.

The description and figures below describe the steps to create such a network and deliver data, especially large data such as video, across it. In one embodiment, these steps include:
  forming a SLAN by direct networking between Wi-Fi access points (SNDs);
  addressing the SND nodes in the network using multicast DNS, or similar, protocols;
  searching for content on the SLANs without interaction with an ISP or private network;
  transferring content directly between Wi-Fi access points (SNDs and attached clients) without interaction with an ISP or private network;
  data caching and partitioning right at the Wi-Fi access points (SND); and
  data and network security, tracking, and analytics without interaction with an ISP or private network.

The description of embodiments of the invention characterizes a SLAN created by replacing existing, or adding new, Wi-Fi access points with SND capable hardware and software. It assumes deriving the benefits from the existing topology of these points, e.g. at homes, at coffee shops, at work, at airports. However, one skilled in the art could imagine placing these devices in strategic locations to "complete" the SLAN and provide just this type of "last foot" networking benefit. In other words, embodiments of the invention include both ad-hoc creation and designed creation of this SLAN.

Also, embodiments of the invention are not limited to the ad-hoc creation of these networks to (relatively) physically fixed Wi-Fi access points. One skilled in the art in view of the present disclosure can imagine these networks being spontaneously created with mobile devices that may also have the required functionality.

Description of CDN, Pop, and LANs with Wi-Fi Access Points

FIG. 1a is a diagram of an example exchange over the Internet. The Source Server 101 contains the origin content, e.g. video. The Client Device 105 requests the content (after an appropriate authentication and transaction for a given business model). Physically, the Source Server 101 and the Client Device 105 could be many kilometers apart, even continents away. There is no direct connection between the Source Server 101 and the Client Device 105, as that simply would not scale.

Traditional networking partitions the data into packets. Each packet is sent to an Internet Node 102 and is repeated to another node and so on along a Data Packet Path 106 until the packet is received by an Internet Service Provider (ISP)

103 and then the Client Device 105. The path of the data packet could require multiple hops (i.e. passing through several Internet Nodes 102). The Internet Nodes 102 can be all over, including all over the globe. Furthermore, each packet in a data transfer might take a different path. In one embodiment, the path depends on sophisticated algorithms, known to those skilled in the art, that depend on factors such as, but not limited to, bandwidth, availability, and connectivity at the nodes. While these algorithms attempt to reduce, and potentially minimize, the packet path, the Source Server 101 cannot predict, or demand, low latency or sufficient bandwidth. Also in this model, the Source Sever 101 itself could be a bottleneck if there is a great demand for its content.

FIG. 1b shows an existing method to reduce latency and network Internet traffic (e.g. between a PaaS or IaaS providers regional nodes), that includes the Content Delivery Network CDN Edge Servers 107. By moving the data directly from the Source Server 101, often using high bandwidth, predictable and/or dedicated networking, and caching the data in geographically distributed CDN Edge Servers 107, the data is physically closer to the client's Internet Service Provider 103.

The main advantage to using CDNs is the data propagation to the geographical edge of the network. The content is closer, and therefore faster, to get to the client. Data propagation of static content takes time though. In many cases, data is propagated (proactively pre-loaded or updated) before the first access.

With effective caching and prediction strategies, CDNs significantly reduce bandwidth stress on the source servers and latency to the client. Now the Data Packet Path 108 is significantly shorter and, perhaps, more predictable. This is the most common method that large video content providers use today.

Yet high latency and bandwidth demands persist even with CDNs. So a few companies like Twitch, Amazon's video game streaming service, have moved servers even closer to the edge by installing them in some ISP's Point of Presence (usually last node before the client). FIG. 1c shows this variation with a predictable or direct network connection between the Source Server 101 and an ISP 103. A dedicated server, facilitated by the content source company (most likely), is located in the ISP data center 103. Now the Data Packet Path 109 is even shorter and more predictable. However, this solution is expensive and hard to scale, and thus, only done by a few services that can charge a premium for improved customer experience.

Embodiments of the invention have two additive advantages that can supplement any of these networking approaches. First, it creates a local area network with data caching even closer to the client device. Second, serving requests for data that are cached locally can be executed without involving the Internet, or even the ISP.

FIG. 1d shows the SLAN 112 centered on the specific SND 113 connected directly to the Client Device 105. Given a specific request for data by the Client Device 105, it is discovered (by methods described below) that the data is located on specific SND 114. Using this information, the data is then transferred to the specific SND 113 and then directly to the Client Device 105 via the Data Packet Path 111. Note that this path does not involve the ISP or the Internet.

Definitions

Note that this disclosure will use the present state-of-the-art method of wirelessly connecting popularly called Wi-Fi (a trademarked phrase representing the family of IEEE 802.11x standards). While Wi-Fi is one method for wireless networking, one skilled in the art can imagine successor technologies (wired, wireless, or contact) being used for the purposes of embodiments of the invention. Furthermore, there are other contemporary wireless technologies (e.g., Bluetooth, Near Field Communication, etc.) that could be used. Finally, embodiments of the invention could also worked with a mixture of technologies for networking, both wired and wireless.

For descriptive purposes, the term "Wi-Fi access point" is used to refer to a device that is connected on one side to the Internet (e.g. via an ISP) and on the other side to client devices via Wi-Fi. However, the term "access point" is a more general description that implies network access regardless of the wireless or wired protocol. In one embodiment, an access point is any last point on the edge of a network that enables client devices to connect directly. Note that a single physical device can offer several Wi-Fi signals. Also note that a single physical device can have multiple Wi-Fi signals each with a different Service Set Identifier (SSID).

A Wi-Fi repeater is a Wi-Fi access point that repeats packets from other Wi-Fi access points. In one embodiment, Wi-Fi repeaters are used to bridge communication between a client device and the access point with a connection to a modem (and the ISP or private network), thereby "extending" the Wi-Fi range. In one embodiment, Wi-Fi repeaters use the same SSID as the originating Wi-Fi access point.

A single point in a network of computing devices is called a node. Traditionally, Wi-Fi access points or Wi-Fi repeaters are the last node in the network before the client device.

Content is data that is generally large and has some persistence value (i.e. it is potentially still valuable at a later time). An excellent example of content is video data. Video data tends to be large, may be requested several times, and does not need to be refreshed. Examples of data that is not considered content in this disclosure are metadata describing content, messages passed between devices, request calls, and other API related data. Note that this non-content data can be repeated by SNDs.

Description of Embodiments of a Special Local Area Network (SLAN)

In one embodiment, Special Network Devices (SNDs) connect and interact with each other, thus acting as nodes in the Special Local Area Network (SLAN). The definition of the SLAN for purposes herein is the network created by all of the SNDs that are able to address each other. In one embodiment, the addressing is direct via the Wi-Fi signal. The SLAN can extend beyond the Wi-Fi signal range if there is one, or more, bridge SNDs that can act as Wi-Fi repeaters. Any data packet would "hop" through these bridge SNDs. Conceptually, this network could extend to a great geographical distance with many SNDs if there are bridge SNDs in the physically correct locations.

In FIG. 2, the SND 200 is connected via one or more Wi-Fi signals to the SNDs 201, 202, 203, 204, and 205 creating the SLAN 210. SND 201 is connected via Wi-Fi signal to SNDs 200, 202, 205, 206, 207, 208, and 209 creating the SLAN 211. Using the connection between SND 200 and SND 201 as Wi-Fi repeaters, all of the SNDs are connected, either directly or with one hop, to each other. Thus, SLAN 210 and SLAN 211 are joined into a single SLAN.

Methods for discovering and connecting between SNDs and creating SLANs are described below. Using methods described below, the SND requests information about all the SNDs on the SLAN. Depending on the embodiment, these connections are described and, in some embodiments, shared using structured lists (such as CSV, JSON, etc.) or using local or global databases (e.g., Graphing Databases, Relational Databases, NoSQL databases, etc.). In other embodiments, the addressing is not shared until there is content found. This is also described below.

Table 1 shows a textual description of the connections between the SNDs in FIG. 2, as an example embodiment. Any two SNDs that are Wi-Fi signal connected to each other can pass data directly. Otherwise, one or two hops are required. For example, as shown in FIG. 2, SND 203 can communicate with SND 200 directly. However, for SND 203 to communicate with SND 205 the packets are repeated by SND 200. For SND 203 to communicate with SND 209 the packets are first repeated by SND 200 and then a second time by SND 201.

TABLE 1

SLAN connection description

| SND | Wi-Fi signal connected SND |
| --- | --- |
| 200 | 201, 202, 203, 204, 205 |
| 201 | 200, 202, 205, 206, 207, 208, 209 |
| 202 | 200, 201 |
| 203 | 200, 204 |
| 204 | 200, 203 |
| 205 | 200, 201 |
| 206 | 201 |
| 207 | 201 |
| 208 | 201 |
| 209 | 201 |

There are various ways to represent this table in database form, for example node and edge descriptions in a graphical database. With the right representation it is possible to discern how to address all of the SNDs in the SLAN. However, it may not be necessary for the SNDs or a network controller to know this network topology to find or transfer content around the SLAN. This is described below.

Hardware and Software for Embodiments of a SLAN

For descriptive purposes, the term "Special Network Device" (SND) is used to refer herein to a physical (or virtual) device that has all of the functionality to participate in a SLAN. In one embodiment, an SND may or may not have a connection to the Internet via a modem; one or more Wi-Fi signals; data storage capability for caching content and partitions of content; and computational hardware and software sufficient to join the network, search for content, and transfer content. While all of this could be manufactured in a single purpose-built enclosure, it could also be constructed using conventional modems, Wi-Fi access points, and computers. To be clear, in one embodiment, a SND is a traditional Wi-Fi access point with additional hardware and software needed for the SND functionality described herein.

FIG. 3 shows a block diagram of the elements of a SND. ISP Connect 300 is the connection to the Internet Service Provider or private network. This connection could be directly wired or wireless using standard hardware, software, and protocols. The Modem/Receiver 301 receives the data and translates from network signals to packets and understands these packets. The Router 304 sends the packets to different devices via Wired Connect 307. The Router 304 is optional for SNDs but shown here. An Internet connection is not required for a SND. It can connect to other SNDs, and/or act as a repeater for a traditional Wi-Fi access point, and still have the advantages described herein.

The Main Wi-Fi Signal 305 transmits and receives data via Wi-Fi 308. In one embodiment, Main Wi-Fi signal 305 interacts with a client device. Optionally, Main Wi-Fi Signal 305 uses multiple separate Wi-Fi signals with separate SSIDs. In one embodiment, each of the multiple separate Wi-Fi signals are at different frequencies, e.g., 5.0 GHz and 2.4 GHz. In one embodiment, SNDs behave exactly like conventional Wi-Fi access points for normal requests.

The Connection Compute and Store 302 is the computer or other processing logic (e.g., one or more processors, controllers, execution units, etc.) that controls the special SND functions like network discovery, content search, content caching, and controlling the transfer of content and content pieces. The Content Cache 303 is memory (volatile or non-volatile) where content is accumulated and stored temporarily. The Side Wi-Fi Signal 306 transmits and receives data via the Side Wi-Fi 309 and is dedicated to SLAN traffic. This function is employed in some embodiments, but not others, as is described below.

In some embodiments, an optional Global Positioning System 310 is included in the SND. In one embodiment, the global position is used when evaluating the analytics generated by the SND and SLAN.

In one embodiment, all of this functionality is assembled in a dedicated piece of hardware or is implemented using an off-the-shelf computer, modem, and Wi-Fi access point hardware except where noted herein.

FIG. 4 shows the software for one embodiment of the SND. These software modules can be embodied in several common methods such as APIs, SDKs, or one or more programs. In one embodiment, the Modem, Router, access point, Wi-Fi repeater Core Software 400 is the typical software present in current modem/router/Wi-Fi access point and Wi-Fi repeater device except where noted herein.

In one embodiment, the Server Software module 407 is a Hyper-Text Transfer Protocol (HTTP) or web server (e.g. Apache HTTP server) and is common in many modem/router/Wi-Fi access point devices. This enables the device to be accessed via protocols like HTTP with settings presented to users as a webpage. Some embodiments use this software for communicating with other SNDs as well as the ISP and clients.

The SND Discovery and Connect module 401 handles the authentication for connecting to other SNDs and enabling other SNDs to connect each other and other devices. In one embodiment, the SND Discovery and Connect module 401 employs a network configuration protocol, such as, for example, but not limited to, Zero Configuration Network or Apple's Bonjour, to query the network for device capabilities, e.g., which devices are capable of SND functionality.

In one embodiment, the SLAN Local DNS Manage module 402 uses a protocol such as multicast Domain Name Server (mDNS), which is part of the Zero Configuration Network protocol, to discover, record, and share the identities of the SND on the SLAN. This is where the description of the network in database form can be (optionally) created and stored (see Table 1).

The SLAN Content Search module 403 searches for content requested by the client device.

The SLAN Content Transfer module 404 transfers and/or repeats packets to effect the transfer of data from the SND in the SLAN where the content is found to the client device.

The SND Content Cache module 405 strategically stores content, or pieces of content, that are passed through the SLAN. The strategy for caching content depends on a number of factors such as the content's novelty in the SLAN, popularity, size, frequency of access, and a number of other factors. Caching algorithms that may be used are known to those skilled in the art. In one embodiment, both heuristics and machine learned caching strategies are employed. The efficacy of the caching strategy is recorded by several metrics which are then used to improve the strategy. That measurement and learning functionality is part of this software module, in some embodiments. In other embodiments, there is a central server that collects the analytics data (see below) and performs the strategic modifications, either in real-time or off-line.

The SND Analytics module 406 reports the metrics for the caching and other information pertinent to the caching strategy, network topology, or even the business model.

The Global Position System module 408 reads and shares the global coordinates of the SND with the SLAN and network controller(s). In one embodiment, this optional component is used for analytics.

In some embodiments, a client device is connected to a traditional Wi-Fi access point and a computer is used to simulate or replicate the functions of an SND. In this case, the client device's software functionality is similar to that of the SND.

Forming a Network of SNDs

In one embodiment, SLANs are formed when at least two SNDs connect to each other. All the SNDs network together in a mesh formation.

There are at least two different types of embodiments in which SNDs discover and join a SLAN. The first type of embodiment is a self-organizing network. The SNDs form a peer-to-peer network using local discovery such as, for example, but not limited to, Zero Configuration Network, Apple's Bonjour, multicast DNS, and other similar protocols.

In an example embodiment of the network organizing process, referring to FIG. 5, an individual SND starts the process by looking for like devices by searching for specific SSIDs 500. These SSIDs are usually hidden, i.e. the SSID is not broadcast. (While hiding SSIDs is a common practice for Wi-Fi security, the goal here is to not confuse users with inaccessible SSIDs while they are trying to connect a client device.) In some embodiments, with the SSID known, the SND attempts connect directly using either traditional software authentication (SSID plus password). For greater security, in one embodiment, the SND has a secure communication with a server using a protocol such as Transport Layer Security (TLS). The server delivers the specific password for the SSID (presumably unique to a single SND). Other forms of secure authentication may also be employed. The first SND then connects to the second SND 510.

Once connected, the SND can interact with the other devices, at first, via a system like Apple's Bonjour. The SND creates a name for itself (assuring that it is unique by querying the network) and publishes that name for the other SNDs on the local network 515. In one embodiment, the SND uses its unique Media Access Control (MAC) address for a name. The SND can query for the service records (e.g., capabilities, names, addresses, ports, etc.) of all the other devices on the SLAN 520. This will cause one or more of the SNDs on the network to respond with these records 523. In many embodiments, there are multicast DNS caching schemes that reduce the number of SNDs that need to respond. Also, such a request can be used for the other SNDs to update their own records. At this point, the new SND has enough information to formulate its own local records 530.

There are ways that some of the embodiments of this invention might differ from features of standard implementations.

First, in one embodiment, the effective SLAN network only includes SNDs so all devices would have the capability when queried. In some embodiments, to reduce chatter, the SNDs might have an inherent order (alphabetical by name, numerical by IP address, age by time of connection, etc.) with which to respond. The first on the list responds with the entire record set for the whole network. If that SND does not send a response within some timeout, the second on the list sends it, and so on.

Second, in some embodiments, there is a list of connections in the network that denotes how many hops are required to reach a device is sent. Conversely, a table of information similar to Table 1 is sent to the SNDs in the SLAN.

Another difference in embodiments is that a similar broadcast protocol is used to search for specific content on the network. This is described in greater detail below.

In one embodiment, the SLAN includes a network controller and is a network controller assisted network. In one embodiment, the network controller is a typical network server, usually located on the Internet or private network, often at the ISP. This network controller has the capability for receiving, storing, and delivering information about SLAN locations, SSIDs, authentication passwords, and the pertinent information for forming the network. In one embodiment, the network controller also records the mapping of cached content and control caching decision. This is described below.

In one embodiment, a SND communicates with a network controller to find other SNDs and to join the SLAN. In one embodiment, this server is located in a specific SND or permanently attached client device that is designated as the local server. In this case, it is still necessary to access the server via the ISP, Internet, or private network to establish the first connection. In other embodiments, this server is located at the ISP or elsewhere in the Internet or private server.

With some embodiments, the network controller performs the role of DNS as well as secure password source. Referring to FIG. 6, the new SND searches for SSIDs, hidden and others within range 600. The SND sends this list, securely, to the server 605. It is then the server's responsibility to figure out which of these SSIDs are SNDs and which is the most appropriate for the new SND to connect to. The server then sends that S SID and the password, securely, to the new SND 607. The new SND connects to the other SND 610 and sends the server a success or failure message. The server then assigns a name and address for the new SND 615. The new SND records that name and address for responding to queries in the future.

SLAN Addressing and Multiple Hops

In order for the SNDs to communicate with each other, in one embodiment, they have unique identifiers (such as Media Access Control address or MAC address) and domain names (or IP addresses assigned using mDNS). The description above shows how these names are assigned, in some embodiments via peer-to-peer methodology with the list stored locally and in other embodiments with the assignment and list handled by a remote server.

With the DNS or SLAN network list, any SND is able to pass messages and/or content directly with each other using traditional protocols such as, for example, File Transfer Protocol (FTP) and HTTP. In some embodiments, however, there is a difference between this arrangement and a regular network. The SNDs in these embodiments are aware of how many (minimum) hops away another SND is. Thus, it is possible for an SND to evaluate whether it is more efficient to request content from a distant, multiple hop SND or directly from the Internet. For the purposes of this disclosure, this is called multi-hop access for multiple hops (Wi-Fi repeater) versus no hops.

Note that while Wi-Fi repeater technology is useful for extending the physical range of a Wi-Fi access point, it does so by repeating the packet and using more time and more wireless bandwidth. This should be considered dynamically when judging whether to request content that requires multi-hop access.

Data Discovery and Search

In one embodiment, when a client requests to access content (e.g. play a movie) the first step is authenticating that the client has permission (e.g. has paid for the movie). That authentication process is beyond the scope of this disclosure; however it can be assumed that either there is an interaction with a paywall server or the rule-based player technology such as described in U.S. Pat. No. 8,751,795 B2, "Secure Transfer and Tracking of Data Using Removable Non-volatile Memory Devices", incorporated herein by reference, is used. In one embodiment, at a minimum, the request has a global unique identifier (GUID) for the session and a content identifier for the content.

To find content, or all the pieces of content, multiple types of embodiments, such as peer-to-peer and network controller, may be employed.

In peer-to-peer embodiments, the SND connected to the requesting client broadcasts the request to the SLAN similar to the Zero Configuration Network protocol. Any SND node in the network with the entire content, or a piece of the content (e.g., fragments of the content identified with meta-data that enables reconstruction), responds to the request describing the content.

Note that in these embodiments, no network list is necessary. The Zero Configuration Network protocol is extended to include searching on specific content. In this case, it is unnecessary to know either the topology or address list of the SLAN ahead of time. The response to the request includes the service record and ultimately the address of the SND with the requested content.

In an alternate embodiment, the individual SND nodes are queried directly (one by one) using the local domain name stored on the requesting SND. In an alternate embodiment, the local domain names for the SND nodes are stored on a server (as described above).

All responses are passed back the originating SND with the description of the content piece available and the addressing required to access it.

FIG. 7 shows the two SLANs from FIG. 2. In this case, when SND 700 broadcasts a content search message to all the SNDs 701-709, only the SNDs with that content responds.

In another embodiment, a network controller system similar to BitTorrent is used. BitTorrent is a peer-to-peer content delivery system where content, or pieces of content, are stored on client devices. The Internet Protocol address and location of content and content pieces are listed on a network controller, called a Tracker. With BitTorrent, the content or pieces of content can be located in client devices anywhere around the world, called a Swarm. To access the content or piece thereof, the BitTorrent Tracker informs the requesting client of the address(es) for the content and the client requests content directly.

Some embodiments described herein can use the same approach. A network controller accounts for the address and location of content cached on SLAN. When an SND requests content the network controller informs that SND of the address(es) for the cached content in the SLAN and the SND requests content directly.

Embodiments of this invention that use this approach have a few advantages over BitTorrent. First, with BitTorrent the content is often partitioned into pieces specifically to compensate for the unbalance bandwidth offered by many ISPs. That is, the upload bandwidth is often inferior to download bandwidth. If several pieces are requested at the same time, the additive speed of multiple uploads can come closer to matching the requesters download speed. However, with the networking arrangement described herein, the transfer speed between SNDs is more or less balanced. Therefore, fragmenting the content into pieces does not matter in terms of unbalance bandwidth. (There are other reasons to fragment content into pieces. For example, fragmentation might distribute the caching burden and perhaps the local Wi-Fi congestion throughout the SLAN.)

Another advantage over BitTorrent is that the cached content is accessed within the SLAN. There is no need to access the ISP, Internet, or private network. Thus, the content access will be faster and not contribute to ISP, Internet, or private network bandwidth congestion.

Data Transfer

In one embodiment, data transfer is achieved using Internet Protocols routing between the SND nodes in the SLANs. There is no need, in most cases, to route the content through the ISP or other parts of the greater Internet. It is here that the great bandwidth and latency reductions are achieved.

Note that the content or pieces of content can be cached on an SND node or on a client device attached to an SND node.

Content partitioning strategies, similar to those employed in BitTorrent (pieces), can reduce the caching burden on single nodes and might also reduce the content transfer burden of those nodes. These strategies are employed when dictated by topology of the network, size and popularity of the content, and other factors that are determined.

In one embodiment, routing between the nodes uses traditional network techniques that optimize data packet paths give topology and current usage. There are a number of networking strategies that can be learned given the topology of the network, usage patterns, and requests underway. Much of the network optimization and content caching algorithms used in LANs and the Internet can be exploited with SLANs.

As described above, in one embodiment, the requesting SND sends a special Zero Configuration request for specific content and receives either no response or one or more responses. There are several ways for the requesting SND to determine the best source for transferring the content.

In some embodiments, the requesting SND uses Ping, a known software function, to determine the latency between the requesting SND and the SND or multiple SNDs with the content. The source of the content with the lowest latency (or other factors like bandwidth capabilities) is the SND chosen to transfer the content. In some embodiments, the requesting SND also Pings the ISP, Internet, or private network. If that Ping is the lowest latency (or other factor) then the content is downloaded directly.

In some embodiments, the requesting SND requests content from all the sources. The first content packet received is sustained. The other requests may be cancelled.

In some embodiments, the topography of the network, such as that defined, for example, in Table 1, is used to predict the transfer performance based on the number of Wi-Fi repeaters, network hops, the content will have to navigate. This is a more complicated method than the two described above and only estimates the latency of a transfer.

Data Caching

The description above explains that content, or content pieces, are cached locally on SNDs. It has been stated that there are a number of ways to determine what content to cache and for how long. All of the extensive list of technologies, known to those skilled in the art, for optimizing content caching strategies may be used in embodiments described herein.

In one embodiment, however, the caching in the SLAN has a somewhat uncommon (but not unique) characteristic. The content cached across a SLAN is actually a distributed cache with the content, or content pieces, cached physically one or more of the SNDs in the SLAN. These SNDs are, in many embodiments, crowd-sourced in terms of location, capability (e.g., cache size, transfer speed, etc.), and persistence (i.e. online uptime may vary). Thus, there are challenges to create a coherent cache strategy for a SLAN.

There are a few solutions to this caching challenge. In some embodiments, the individual SNDs simply ignore any other SNDs when caching content. Presumably, a request for content on the SLAN was made without success before a request to the ISP, Internet or private network. Thus, it can be assumed that the new content—acquired not from the SLAN but from the ISP, Internet, or private network connection—is unique.

In other embodiments, a network controller is used to direct specific SNDs to cache specific content as it passes through SNDs. In yet other embodiments, there are messages passed from the cached content source SND along with the content suggesting information (e.g., locations, number of hops, etc.) that would lead an SND to cache content or not.

In addition to caching content on SNDs, in some embodiments, the content or content pieces are located and accessed on client devices that are connected to SND nodes in the SLAN. In these embodiments, the content on the client device is considered a virtual extension of the SND cache. Referring again to FIG. 2, in one embodiment, content that resides on the Client Device 212 is considered part to the cache on SND 204. When SND 204 receives a request for content, it then queries and requests the content from Client Device 212 and then passes it on to the original requester. Of course, content on the client device is controlled by the user and may not be available with the same consistency and constancy as the SND cache. The user might delete the content or disconnect the device at any moment.

In some embodiments, certain content is "preloaded", in that it is proactively downloaded and cached at some SND on the SLAN. Which content is preloaded is a function of several factors. For example, in one embodiment, the content is predictive by artificial intelligence algorithms analyzing the consuming behaviors of the users on the SLAN. In another example, the content is part of a series of content (e.g., a television series) for which the user has subscribed. In yet another example, the content is part of a promotional package of content from a content provider (e.g. the latest offerings from Home Box Office).

In some embodiments with preloaded content, there is a network controller that knows the SLANs to which certain users are often connected. The server proactively requests that a SND in that SLAN download the content, or it transmits the content directly to the SND. This is also the case in embodiments where the SLAN is a virtual content kiosk (described below). In other embodiments, the SND proactively requests any speculative content, not already present on the SLAN, from content providers when a user connects.

There are many algorithms, both learned and heuristic, for determining which content persists and which is deleted from a given SND's cache. A common heuristic, previously mentioned, is replacing the least accessed content with the new content. However, preloaded content, especially for virtual content kiosk functionality, might be subject to different criteria.

Data and Network Security

Embodiments of the invention use traditional network security for data traffic. For example, including Transport Layer Security (TSL) and Secure Shell (SSH) can be used with certificates either preinstalled in, or requested by, the SND.

Content security is achieved (in general) by encrypting the content at the source. The SNDs, generally, do not decrypt content. The SNDs only need to know the identity of the content or content pieces to properly cache and deliver the content.

Content security can be achieved by a variety of methods. One embodiment uses the techniques found in U.S. Pat. No. 8,751,795 B2, "Secure Transfer and Tracking of Data Using Removable Non-volatile Memory Devices", incorporated herein by reference. This includes a dedicated player with Digital Rights Management encryption, tracking, and rule-based playback. In this embodiment, only the authorized player can decrypt and play the content.

Local Peer-to-Peer Versus a Network Controller

As described above, there are different embodiments possible for connecting to a network, searching for data, and for caching decisions. In each case, these functions can be performed locally or via peer-to-peer. Alternatively, these functions can be performed with using a network controller.

In one embodiment, when connecting via peer-to-peer, the SND searches for a hidden SSID representing the SLAN signal and joins that network. In one embodiment, when connecting with a network controller, the SND uploads the list of SSIDs that it can see (and optionally its location) and the network controller suggests the SSID and password to join.

In one embodiment, when searching via peer-to-peer, the SND broadcasts a modified Zero Configuration message to the network and SNDs with the content respond. In one embodiment, when searching with network controller, the SND request content addressing instructions from the network controller which acts as the search engine for the SLAN.

In one embodiment, when caching via peer-to-peer, the SND makes the decision to cache the content based on whether or not that content is on the SLAN somewhere else (as well as a number of other possible parameters). In one embodiment, when caching with a network controller, it is the network controller that signals to an SND which data to cache.

In the descriptions of the embodiments, the functionality for connecting, searching, and caching have been presented as either peer-to-peer or facilitated with a network controller. However, in many embodiments the SND is capable of either method for one, two, or all three of the functions. Furthermore, these functions do not have to be performed the same way with every SND in an SLAN. Nor do these functions need to be performed the same way every time by the same SND. These functions can co-exist in a heterogeneous mix of SNDs.

Likewise, embodiments of the network controller(s) can be different. The connection, searching, and caching functions do not need to be performed by the same network controller or even in the same location of logical domain. A heterogeneous mix of network controllers can exist.

SLAN Performing the Delivery of a Mo-DV Kiosk or SpeedSpot

In the embodiments described so far, the client device is assumed to be connected to the traditional Wi-Fi access point signal broadcast by the SND, and this client device is assumed to have connected to this Wi-Fi access point in the traditional way, i.e. selecting a SSID signal and entering the password. However, in some embodiments, a SLAN and/or a SND performs the functions of a content dispensing "kiosk" or SpeedSpot as described in "Content Distribution Systems and Methods," U.S. Pat. No. 10,104,046 B2, incorporated herein by reference. In this case, the kiosk consumer client device connects and performs functions using a special application on the kiosk consumer client device.

These embodiments employ the same connection, search, transfer, and caching functions described above. In fact, these embodiments can be used for client devices as described above in addition to the new functions described here. These kiosks, in many embodiments, are an added function of the SND and SLAN.

The kiosk embodiments differ from that of the typical SND/SLAN functions in a few ways. In some embodiments, the "kiosk" is a physical device with branding to attract and market the product. In other embodiments, the "kiosk" is simply the SND Wi-Fi access point signals that connect to the SLAN. In other words, the idea of the kiosk is virtual. In these embodiments, the SLAN is the kiosk.

In many embodiments, the client device has special software. In on embodiment, this software performs many functions such as (1) authenticating and connecting directly the the SLAN Wi-Fi signal without user assistance; (2) transact or authenticate a transaction for buying or renting the content; and (3) assist the user in finding physical locations where connections to the SLAN can be made.

As described above, in some embodiments, the content is proactively delivered (preloaded) to a SND in a SLAN. As described above, the content chosen for preloading can be predicted by a learning algorithm that is measuring content traffic. This can extend to the kiosk function in the same way it did for the client device describe above.

However, in some of the kiosk embodiments, the content preloaded is a set library that is offered by a content provider. For example, the latest movie releases or game highlights could be preloaded. Note that the same embodiment can offer this service to both the kiosk users (that is client devices that automatically connect via special software) and traditional client devices (client devices connected via authentication to the client SSID signal).

In other words, if a user obtains a SND to connect to their ISP, then that SND, and possibly the SLAN to which it is connected, can automatically serve as a "crowd sourced" kiosk for other users.

Dynamic Load Balancing between the ISPs Connected to the SLAN

In some embodiments, the SLAN networks are used to load balance between ISPs. In this case, the SNDs of an SLAN are connected to two or more different ISPs. At any given time the bandwidth from the ISP to the SND can vary. In these embodiments, if an SND has a request that cannot be served locally by the SLAN (i.e. has to go through the ISP), the bandwidth of the ISP can be measured (using Ping and other software known to those skilled in the art). If the ISP bandwidth is found to be below some measures, the SND can make a request to find a SND on the SLAN connected to an ISP with better performance at the moment. Then the request is made from the first SND to the responding SND connected to the better performing ISP and the content is transferred thusly.

Propagating SNDs

Embodiments of the invention have the potential to create content caching and free up network bandwidth essentially at the first point of a network for a client device. This potential reduction in latency, bandwidth utilization, and the greater predictability and consistency in content delivery are highly valued features. The consumer benefits with a better experience. The ISP benefits with potentially less bandwidth and caching demands. The backbone backend network and source server companies benefit by less bandwidth and better performance. The network device manufacturers can offer SNDs with different configurations and tuning for competitive advantage. And, finally, the content provider benefits by offering a better experience and being more accessible.

There are several models for content delivery and Wi-Fi access currently. In one model, a company creates a private network and installs several Wi-Fi access points. Clearly, replacing some or all of these Wi-Fi access points with SNDs would reap a benefit, especially if the company's private network delivers a lot of the same content to multiple employees. Likewise, a company may install several SNDs connected directly to an ISP but restrict the SLAN to company installed SNDs.

In some cases, businesses set up Wi-Fi access points for customers. In places like coffee shops, airports, and stadiums using this technology could be a big advantage in high demand areas. This is an especially good environment for the content delivery kiosk.

In some cases, ISPs (such as Comcast's Xfinity) sell, rent, or give modem/Wi-Fi access points to their customers. In some cases, these devices also provide "crowd sourced" Wi-Fi hotspots (called xfinitywifi in the case of Xfinity). The customers have the technical interface to "opt out" of providing a hotspot, but many do not. Replacing these devices with SNDs would provide all the aforementioned benefits to the ISP customers and could provide kiosk and SLAN access to other customers as well. (See the example below.)

In many cases, Wi-Fi access points are located in homes and businesses without any coordination. Neighbors might have different ISPs with different capabilities and modem/Wi-Fi access point hardware devices. If these neighbors purchase or rent SND capable devices, they and their neighbors can reap the benefits. See the example below.

In one embodiment, the individual SND is configured to opt out of all or some of the functionality. For example embodiments, an SND could disallow certain other SNDs from connecting in the first place. The SND could prohibit the caching of certain content. The SND could limit the content that it requests from the SLAN. The SND could prevent others from requesting content through it to the ISP connected to that SND. The SND could prevent the query and requesting of content from certain, or all, attached client devices.

These prohibitions, and many more, can be configured either by the user or the owner of the SND (perhaps a company), saved as state, and then looked up by the SND before any functions are performed. This type of settings technology is common and straight forward and well known to those skilled in the art. However, the transparency and control these settings offer are critical for user acceptance and comfort with using this invention.

Example of a Centrally Administrated Set of a SLAN

To further illuminate the character of the techniques described herein, an example system deployed by a single ISP network provider is described in this section. This example relies on the ISP's network controllers for discover, connection, DNS, and content search.

In this example embodiment, a single large ISP (e.g., Comcast's Xfinity product) provides SND hardware to a number of its customers. Most, if not all, of the SNDs are the same dedicated hardware including a modem, at least two Wi-Fi signals (one for connecting to the clients and a hidden network for creating SLANs), significant cache memory, and a CPU and software that manage the SLAN interaction.

The customers install these SNDs in their home, business, or elsewhere as they wish. Similar to the way xfininitywifi hotspots, which originate in Comcast provided hardware, the customer can used software settings opt out of SLAN networks.

The ISP server knows the locations (more or less, depending on whether GPS is used) of these SNDs. When a customer turns on their SND for the first time, the SNDs upload the SSIDs of all of the other Wi-Fi signals within range to the ISP server. The ISP server knows which of these are also its own SNDs and instructs the new SND to join the hidden SSID of a SND in the SLAN network. Now the SND and the ISP server know the topography of the specific SLAN. In one embodiment, the ISP server stores this interconnected network information in a data store.

Subsequently, the new SND receives a request for a large piece of content from a client device, perhaps a movie, and the SND sends the request to the ISP server. The ISP server initially searches for the content (or content piece) within the SNDs SLAN. If the content is not found cached on any of the SNDs in the SLAN, then the ISP requests the content from the Internet. Now when the SND receives the content from the ISP (from the Internet, not the SLAN), it is accompanied by caching instructions from the ISP server. It then caches the content locally (stored on the SND) according to those instructions. In one embodiment, the caching instructions include functions like the duration of the storage, whether it is checked for update consistency before it is accessed from the cache, whether to fragment the content, whether to push it to other SND nodes in the network, and what to do with replacement content that might be pushed from the ISP later.

Otherwise, if the content is found cached on one or more of the SND(s) in the SLAN, the ISP server instructs the SND where access the content locally. The content is the transferred to the requesting SND through usual networking means.

In this example, the SNDs perform as slaves to the central servers at the ISP. The discovery of SLAN, connection to the SLAN, discovery of content, caching instructions, and transfer of content are all orchestrated by the ISP server. All of the learning algorithms and tuning of the caching strategies are performed centrally at the ISP server.

In fact, the ISP server can uncover weaknesses in the SLAN networks, such as holes in signal that prevent effective bridging between networks or insufficient cache memory on certain nodes. The ISP, for example, can proactively alter the physical topology of the network by changing the equipment or physically installing new (non-customer) nodes.

Example of an Ad-Hoc Formed and Administrated SLAN

In these example embodiments, an SLAN is formed by the peer-to-peer interaction of SNDs within range of each other. This ad-hoc network, or any individual SND, may or may not depend on network controllers for some, or all of the network functionality.

When an SND is initially turned on it looks for the hidden secondary SLAN Wi-Fi network. Upon finding the network the SND joins it via a secure password or credentialed transaction.

As in the previous example, the new SND receives from a client device a request for a large piece of content, perhaps a movie. In this embodiment, however, the SND sends a modified Bonjour request to all of the SNDs on its network searching for the content or a piece of the content.

Similar to the previous example, if the content is not found cached on any of the SNDs in the SLAN then the SND requests the content from the Internet. Now when the SND receives the content from the Internet via the ISP, it is cached locally (stored on the SND) according to the caching instructions that are preset, learned, or accompany the content. The caching instructions include functions like the duration of the storage, whether it is checked for update consistency before it is accessed from the cache, whether to fragment the content, whether to push it to other SND nodes in the network, and what to do with replacement content that might be pushed later.

If the content is found cached on one, or more, of the SNDs in the SLAN the requesting SND Pings the SND(s) with the content and, perhaps the Internet, to determine which content source is the best in terms of bandwidth and latency. Then the requesting SND makes a direct request to that source of the content. The content is then transferred to the requesting SND through usual networking means.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network arrangement comprising:
    a plurality of access points comprising a first access point and a second access point that are part of one or more existing networks and operable to individually address and communicate with each other to form a local area network (LAN) to transfer data between two or more of the plurality of access points using point-to-point links independent of their function in the one or more existing networks,
    wherein the first access point comprises a first cache and the second access point comprises a second cache within the LAN, wherein each of the first cache and the second cache is to store a content to be forwarded to other access points within the LAN, wherein the first access point is directly connected to a first client device and the second access point is not directly connected to the first client device within the LAN, wherein the LAN is an access network and is independent of the one or more existing networks including a service provider network;
    wherein the first access point is operable to
        send a request for a desired content to one or more second access points of the plurality of access points without a network list for the desired content, the one or more second access points including the second access point and access points more than one hop away from the first access point within the LAN,
        receive a response including a content identifier of the desired content, an access point identifier including a media access control address of each of the one or more second access points including the second access point which has at least a portion of the desired content stored in the second cache, and a number of hops for each of the one or more second access points to reach the first access point,
        select at least one of the one or more second access points including the second access point which has the at least the portion of the desired content within the LAN based on the number of hops, and
        request the at least one of the one or more second access points to transfer the at least the portion of the desired content to the first access point via one or more direct point-to-point transfers between access point pairs of the plurality of access points within the LAN, wherein the first access point is to forward the at least the portion of the desired content from the second access point to the first client device within the LAN.

2. The network arrangement defined in claim 1 wherein the first access point is operable to address the one or more second access points and wherein the second access point is selected as a source for the at least the portion of the desired content for the first client device.

3. The network arrangement defined in claim 2 wherein the first access point is operable to select the second access points to source portions of the desired content to obtain the desired content by combining the portions provided by the second access points when the desired content is distributed among and stored in caches of the second access points.

4. The network arrangement defined in claim 1 wherein each access point of the plurality of access points comprises a Wi-Fi access point or a hotspot.

5. The network arrangement defined in claim 1 wherein at least one access point of the plurality of access points operates as a repeater that transfers the desired content from the other access points to the first access point.

6. The network arrangement defined in claim 5 wherein the at least one access point acts as a repeater between the LAN and at least one other network.

7. The network arrangement defined in claim 1 wherein the at least the portion of the desired content is stored in a cache of a second client device coupled to the second access point and is transferred to the first access point in response to the first access point requesting the content from the second access point within the LAN.

8. The network arrangement defined in claim 1 further comprising a network controller that includes a mapping of cached content to the plurality of access points, wherein the cached content is accessible through each access point and information to facilitate sharing of the cached content among the plurality of access points, wherein the first access point is operable to:
    search for an SSID of the second access point;
    sending a lists of SSIDs including the SSID of the second access point to the network controller;
    receiving a password for the second access point from the network controller, wherein the second access point is determined by the network controller based on the mapping;
    connect to the second access point using the password;
    receiving a name and an address from the network controller, wherein the name and the address are assigned to the first access point by the network controller.

9. The network arrangement defined in claim 1 further comprising a network server coupled to the plurality of network access points to determine content that is accessible through each of the plurality of access points for transfer among the plurality of access points, a network controller having a search engine to search cached content of access points and to notify the plurality of access points of content location within the LAN.

10. The network arrangement defined in claim 1 wherein selected access points of the plurality of access points are pre-loaded with one or more items of content to be made available for access by other access points of the plurality of access points.

11. The network arrangement defined in claim 1 wherein access points of the plurality of access points are self-organizing into the LAN.

12. The network arrangement defined in claim 11 wherein each node of the plurality of access points finds one or more other access points by searching hidden service set identifiers (SSIDs), wherein the first access point is operable to:
search for an SSID of the second access point;
obtain a password for the SSID of the second access point;
connect to the second access point using the password;
publish a name of the first access point for the second access point;
receive a service record of the second access point;
generate a local record list of the access points in the LAN based on the service record of the second access point.

13. The network arrangement defined in claim 1 wherein caching protocol for a cache associated with at least one access point of the plurality of access points is set by artificial intelligence.

14. The network arrangement defined in claim 1 wherein dynamic load balancing is performed between Internet service providers (ISPs) and access points of the LAN for downloading content from the Internet.

15. The network arrangement defined in claim 1 wherein the first client device operates as a kiosk to enable access to the desired content to one or more mobile devices in communication with the first access point, the kiosk to generate a request for the desired content and to output the desired content once obtained via an output interface on the kiosk.

16. The network arrangement defined in claim 1 wherein the desired content is transferred with DRM protected, trackable, rule-based metadata.

17. A method comprising:
communicating, by access points individually addressing each other, between a plurality of access points comprising a first access point and a second access point that are part of one or more existing networks and form a local area network (LAN) to transfer data between two or more of the plurality of access points using point-to-point links independent of their function in the one or more first existing networks, wherein the first access point comprises a first cache and the second access point comprises a second cache within the LAN, wherein each of the first cache and the second cache is to store a content to be forwarded to other access points within the LAN, wherein the first access point is directly connected to a first client device and the second access point is not directly connected to the first client device within the LAN, wherein the LAN is an access network and is independent of the one or more existing networks including a service provider network;
sending, by the first access point, a request for a desired content to one or more second access points of the plurality of access points without a network list for the desired content, the one or more second access points including the second access point and access points more than one hop away from the first access point within the LAN;
receiving, by the first access point, a response including a content identifier of the desired content and an access point identifier including a media access control address of each of the second access points including the second access point which has at least a portion of the desired content stored in the second cache, and a number of hops for each of the one or more second access points to reach the first access point;
selecting, by the first access point, at least one of the one or more second access points which has the at least the portion of the desired content within the LAN, based on the number of hops; and
requesting, by the first access point, the at least one of the one or more second access points to transfer the at least the portion of the desired content to the first access point via one or more direct point-to-point transfers between access point pairs of the plurality of access points within the LAN, wherein the first access point is to forward the at least the portion of the desired content from the second access point to the first client device within the LAN.

18. The method defined in claim 17 wherein the at least one of the one or more access points is selected as a source for the at least the portion of the desired content for the first client device.

19. The method defined in claim 18 further comprising selecting, by the first access point, multiple access points among the one or more existing networks to source portions of the desired content to obtain the desired content by combining the portions provided by the two or more of the multiple access points when the desired content is distributed among the multiple access points.

20. The method defined in claim 17 wherein the at least the portion of the desired content is stored in the cache of a second client device coupled to a second access point, and further comprising transferring the desired content or portion thereof to the first access point in response to the first access point requesting the content from the second access point within the LAN.

21. The method defined in claim 17 further comprising creating the LAN by having each node of the plurality of access points finding one or more other access points by searching hidden service set identifiers (SSIDs) in a self-organizing manner.

22. A non-transitory computer readable storage media medium having comprising instructions stored thereupon which, when executed by a system having at least a processor and a memory therein, cause the system to perform a method comprising:
communicating, by access points individually addressing each other, between a plurality of access points comprising a first access point and a second access point that are part of one or more existing networks and form a local area network (LAN) to transfer data between two or more of the plurality of access points using point-to-point links independent of their function in the one or more existing networks, wherein the first access point comprises a first cache and the second access point comprises a second cache within the LAN, wherein each of the first cache and the second cache is to store a content to be forwarded to other access points within the LAN, wherein the first access point is directly connected to a first client device and the second access point is not directly connected to the first client device within the LAN, wherein the LAN is an access network and is independent of the one or more existing networks including a service provider network;
sending, by the first access point, a request for a desired content to one or more second access points of the plurality of access points without a network list for the desired content, the one or more second access points including the second access point and access points throughout the LAN more than one hop away from the first access point within the LAN;

receiving, by the first access point, a response including a content identifier of the desired content, an access point identifier including a media access control address of each of the one or more second access points including the second access point which has at least a portion of the desired content stored in the second cache, and a number of hops for each of the one or more second access points to reach the first access point;

selecting, by the first access point, at least one of the one or more second access points including the second access point which has the at least the portion of the desired content within the LAN based on the number of hops; and requesting, by the first access point, the at least one of the one or more second access points to transfer the at least the portion of the desired content to the first access point via one or more direct point-to-point transfers between access point pairs of the plurality of access points within the LAN, wherein the first access point is to forward the at least the portion of the desired content from the second access point to the first client device within the LAN.

23. The non-transitory computer readable storage medium defined in claim 22 wherein the at least one of the one or more access points is selected as a source for the at least the portion of the desired content for the first client device.

* * * * *